(12) United States Patent
Mitarai et al.

(10) Patent No.: US 6,307,284 B1
(45) Date of Patent: Oct. 23, 2001

(54) POSITIONING APPARATUS, INFORMATION RECORDING/REPRODUCING APPARATUS, AND INSPECTION APPARATUS

(75) Inventors: Reiji Mitarai, Hachioji; Kenji Hisamoto, Utsunomiya, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/393,967

(22) Filed: Sep. 10, 1999

(30) Foreign Application Priority Data

Sep. 16, 1998 (JP) .................................................. 10-261858
Sep. 16, 1998 (JP) .................................................. 10-261859

(51) Int. Cl.$^7$ .................................................. H02K 41/00
(52) U.S. Cl. .................................................. 310/12; 318/135
(58) Field of Search ........................ 310/12; 74/471 XY, 74/479.01; 355/53, 72; 414/935, 936; 318/135

(56) References Cited

U.S. PATENT DOCUMENTS

| 4,579,320 | 4/1986 | Gladish | 267/140.13 |
| 4,616,960 | 10/1986 | Gladish | 406/88 |
| 5,228,358 | 7/1993 | Sakino et al. | 74/479.01 |
| 5,917,294 | 6/1999 | Mitarai | 318/41 |

FOREIGN PATENT DOCUMENTS

2329521A * 3/1999 (GB) .

* cited by examiner

*Primary Examiner*—Nestor Ramirez
*Assistant Examiner*—Judson H. Jones
(74) *Attorney, Agent, or Firm*—Fitzpatrick, Cella, Harper & Scinto

(57) ABSTRACT

A positioning apparatus includes a movable member, an actuator for driving the movable member in a moving direction, a gravity guide having a reference surface for supporting the movable member in a gravity direction, a yaw guide for guiding the movable member from one side thereof in the moving direction by means of a guide surface perpendicular to the reference surface, and a measuring device for measuring a position of the movable member in the moving direction. A distance from a measuring position at which the measuring device measures the position of the movable member to the guide surface is longer than a distance from a driving position at which the actuator drives the movable member to the guide surface.

20 Claims, 6 Drawing Sheets

POSITIONING APPARATUS, INFORMATION RECORDING/REPRODUCING APPARATUS, AND INSPECTION APPARATUS

BACKGROUND OF THE INVENTION

1. Field of the Invention

The present invention relates to an ultra-precision positioning technique and, more particularly, to a high-speed, high-precision positioning apparatus which is required to have, for example, a positioning resolution on the submicron order or less. The present invention also relates to an information recording/reproducing apparatus and inspection apparatus which are used in the semiconductor manufacturing industry and the fields associated with the manufacture of high-density recording media such as hard disks and information write/read operation.

2. Related Background Art

FIG. 8 shows a conventional direct-acting positioning apparatus.

An object (not shown) is mounted on a table 521. The table 521 can move in the X direction. A gravity guide 523 supports the table 521 on a horizontal X-Y reference surface in the gravity direction (Z direction). A yaw guide 522 has an X-Z guide surface perpendicular to the X-Y reference surface of the gravity guide 523 and parallel to the moving direction of the table 521, and supports the table 521 in the Y direction. That is, the table 521 is moved in the X direction by "two-surface restraint guiding" by means of the gravity guide 523 and yaw guide 522.

A feed screw driving unit 524 drives the table 521 in the X direction in a noncontact state by converting the rotating motion transferred from a motor into a translating motion. The feed screw driving unit 524 has a motor and feed screw which are substantially integrated with the gravity guide 523, and a nut (not shown) integrated with the table 521 to convert a rotating motion into a translating motion.

An optical encoder 525 measures the position of the table 521 in the X direction. A head is fixed on the yaw guide 522. The encoder 525 measures the position of the table 521 in the X direction at a position near the yaw guide 522. The driving amount of the feed screw driving unit 524 is feedback-controlled by using the position information about the table 521 which is measured by the encoder 525, thereby positioning the table 521.

FIG. 9 shows a model indicating a positional relationship when the conventional stage unit is viewed from the Z direction.

The table 521 has a barycentric position 531. At a yawing restraining position 532, the table 521 is supported by the guide surface of the yaw guide 522 to be restrained in the yawing direction. At a driving position 534, the table 521 is driven by a thrust F from the feed screw driving unit 524. At a measuring position 535, the encoder 525 measures the position of the table 521.

As shown in FIG. 9, the driving position 534 of the thrust F from the feed screw driving unit 524 is set to pass through the barycentric position 531 of the table 521.

In addition, as shown in FIG. 9, the measuring position 535 at which the position of the table 521 is measured is relatively near the yawing restraining position 532. By setting the measuring position 535 near the yawing restraining position 532, even if the table 521 undergoes posture variations in the yawing direction, a disturbance due to the yawing posture variations is prevented from affecting measurement of the position of the table 521 in the translating direction.

In a positioning apparatus for driving a motor by feeding back the position of a table, the transfer function of a system has a great influence on the positioning time and the stability of a feedback system. When, for example, the gain of a feedback loop compensator is increased, hunting occurs in the worst case. If the gain is set low to improve the stability of the system, a necessary steady-state precision cannot be ensured. In addition, if a rotation/translation conversion element such as a feed screw driving unit is inserted in the system, nonlinearity such as hysteresis or lost motion occurs. As a result, a phase delay occurs in the transfer function, and the responsivity deteriorates.

SUMMARY OF THE INVENTION

In general, the productivity of machine tools and inspection devices using such direct-acting positioning apparatuses increases as the positioning performance of the direct-acting positioning apparatuses improves. A direct-acting positioning apparatus is therefore required to have high-speed, high-precision table positioning performance.

It is an object of the present invention to realize a positioning apparatus having a control system with high responsivity at a low cost.

In order to achieve the above object, a positioning apparatus of the present invention is characterized by comprising a movable member which can move, an actuator for driving the movable member in a moving direction, a first guide having a reference surface for supporting the movable member in a gravity direction, a second guide for guiding the movable member from one side thereof in the moving direction by means of a guide surface perpendicular to the reference surface, and a measuring device for measuring a position of the movable member in the moving direction, wherein a distance from a measuring position at which the measuring device measures the position of the movable member to the guide surface is longer than a distance from a driving position at which the actuator drives the movable member to the guide surface.

In addition, in order to achieve the above object, another positioning apparatus of the present invention is characterized by comprising a movable member which can move, an actuator for driving the movable member in a moving direction, a first guide having a reference surface for supporting the movable member in a gravity direction, a second guide for guiding the movable member from one side thereof in the moving direction by means of a guide surface perpendicular to the reference surface, and a measuring device for measuring a position of the movable member in the moving direction, wherein a distance from a driving position at which the actuator drives the movable member to the guide surface is shorter than a distance from the center of gravity of the movable member to the guide surface.

The movable member is preferably supported to the guides by static pressure bearings.

Preferably, this apparatus further comprises a pre-pressurizing mechanism for pre-pressurizing the static pressure bearings, and the pre-pressurizing mechanism comprises a magnet.

The actuator preferably comprises a linear motor.

The actuator for driving the movable member in the moving direction is preferably one in number.

The measuring device preferably comprises an encoder.

The measuring device is preferably one in number.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

<First Embodiment>

Figure 1:
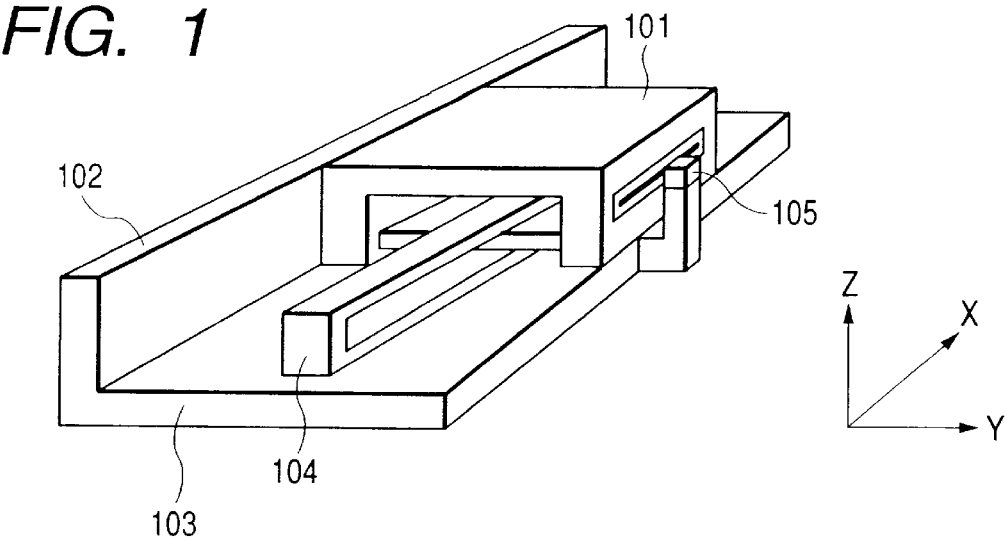
FIG. 1 is a perspective view of a positioning apparatus according to the present invention.

FIG. 1 shows a direct-acting positioning apparatus of the present invention.

An object (not shown) is mounted on a table 101. The table 101 is adapted to be movable in the X direction. A gravity guide 103 supports the table 101 on a horizontal X-Y reference surface in the gravity direction (Z direction). A yaw guide 102 has an X-Z guide surface which is perpendicular to the X-Y reference surface of the gravity guide 103 and parallel to the moving direction of the table 101, and supports the table 101 in the Y direction. That is, the table 101 is moved in the X direction by "two-surface restraint guiding" by means of the gravity guide 103 and yaw guide 102. The table 101 is supported by static pressure bearings (not shown) mounted on the table 101 in a noncontact state with respect to the gravity guide 103 and yaw guide 102. To increase the spring stiffness of the static pressure bearings, pre-pressurizing operation is performed by using the attraction force of a magnet as a pre-pressurizing mechanism. The manner in which the table 101 is supported by the yaw guide 102 will be described later.

An electromagnetic linear motor 104 drives the table 101 in the X direction in a noncontact state. The linear motor 104 has a linear motor stator substantially integrated with the gravity guide 103 and a linear motor moving-element integrated with the table 101. The linear motor 104 extends through the interior of the stage. The driving position at which the linear motor 104 applies a driving force to the table 101 is closer to the yaw guide 102 than the barycentric position of the table 101. This positional relationship will be described later.

An optical encoder 105 measures the position of the table 101 in the X direction. The encoder 105 has a linear scale with a grating and an optical head. The scale is attached to a position remotest from the yaw guide 102 of the table 101. The head is substantially integrated with the gravity guide 103. The encoder 105 measures the position of the table 101 in the X direction at a position remote from the yaw guide 102.

Figure 2:
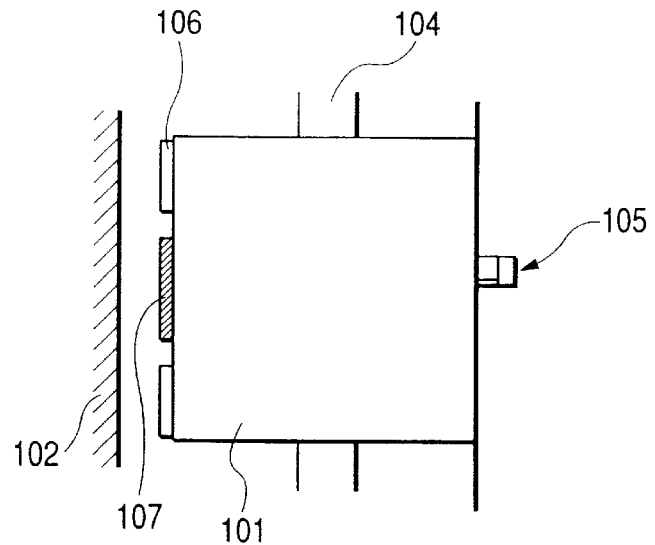
FIG. 2 is a plan view of the positioning apparatus according to the present invention.

FIG. 2 shows the direct-acting positioning apparatus when the stage unit of the present invention is seen from the Z direction.

Referring to FIG. 2, static pressure bearings 106 blow air from the table 101 to the yaw guide 102 to keep a gap therebetween so as to support the table 101 in a noncontact state. A magnet 107 serving as a pre-pressurizing mechanism uses its attraction force to apply a pre-pressure to the gap formed by the static pressure bearings 106, thereby increasing the spring stiffness of the static pressure bearings 106. That is, the table 101 is supported from the guide surface of the yaw guide 102 in the Y direction by using the static pressure bearings 106 and pre-pressurizing mechanism 107 mounted on the table 101. Although not shown, static pressure bearings and a pre-pressurizing mechanism having almost the same structures as those described above are disposed between the table 101 and the gravity guide 103. Since the table 101 is supported by the yaw guide 102, the table 101 is almost free from posture variations in the yawing direction in a statically determinate state. While the table 101 is moving, however, a positional shift may occur in the yawing direction, because the table 101 is supported in a noncontact state.

Figure 3:
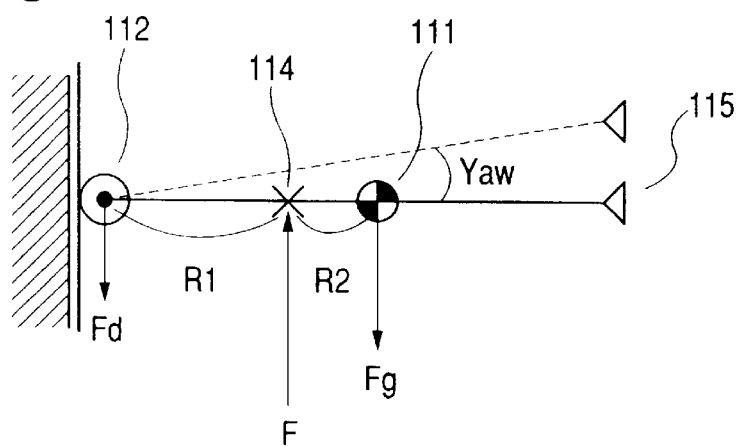
FIG. 3 is a view showing a model indicating the positioning apparatus according to the present invention.

FIG. 3 shows a model indicating the positional relationship among the yawing restraining point, barycentric point, and measuring point when the stage unit of the present invention is seen from the Z direction. This positional relationship greatly differs from the positional relationship in the prior art in that the measuring position is far from the yawing restraining point.

The table 101 has a barycentric position 111. At a yawing restraining position 112, the table 101 is supported by the guide surface of the yaw guide 102 to be restrained in the yawing direction. At a measuring position 115, the encoder 105 measures the position of the table 101. For the sake of convenience, FIG. 3 shows a state wherein the barycentric position 111, yawing restraining position 112, and measuring position 115 are aligned with each other. Obviously, however, these positions need not be aligned.

As shown in FIG. 3, the measuring position 115 at which the position of the table 101 is measured is relatively far from the yawing restraining position 112. When the measuring position 115 is set to be far from the yawing restraining position 112, measurement of the position of the table 101 in the translating direction is influenced by a disturbance due to yawing posture variations as the posture of the table 101 varies in the yawing direction. For this reason, the signal output from the encoder 105 for measuring the position of the table 101 in the X direction contains a disturbance due to yawing posture variations.

With the encoder 105 being positioned in the above manner, feedback control on the translation of the table 101 is performed by using a position signal containing a rotation component.

Figure 4:
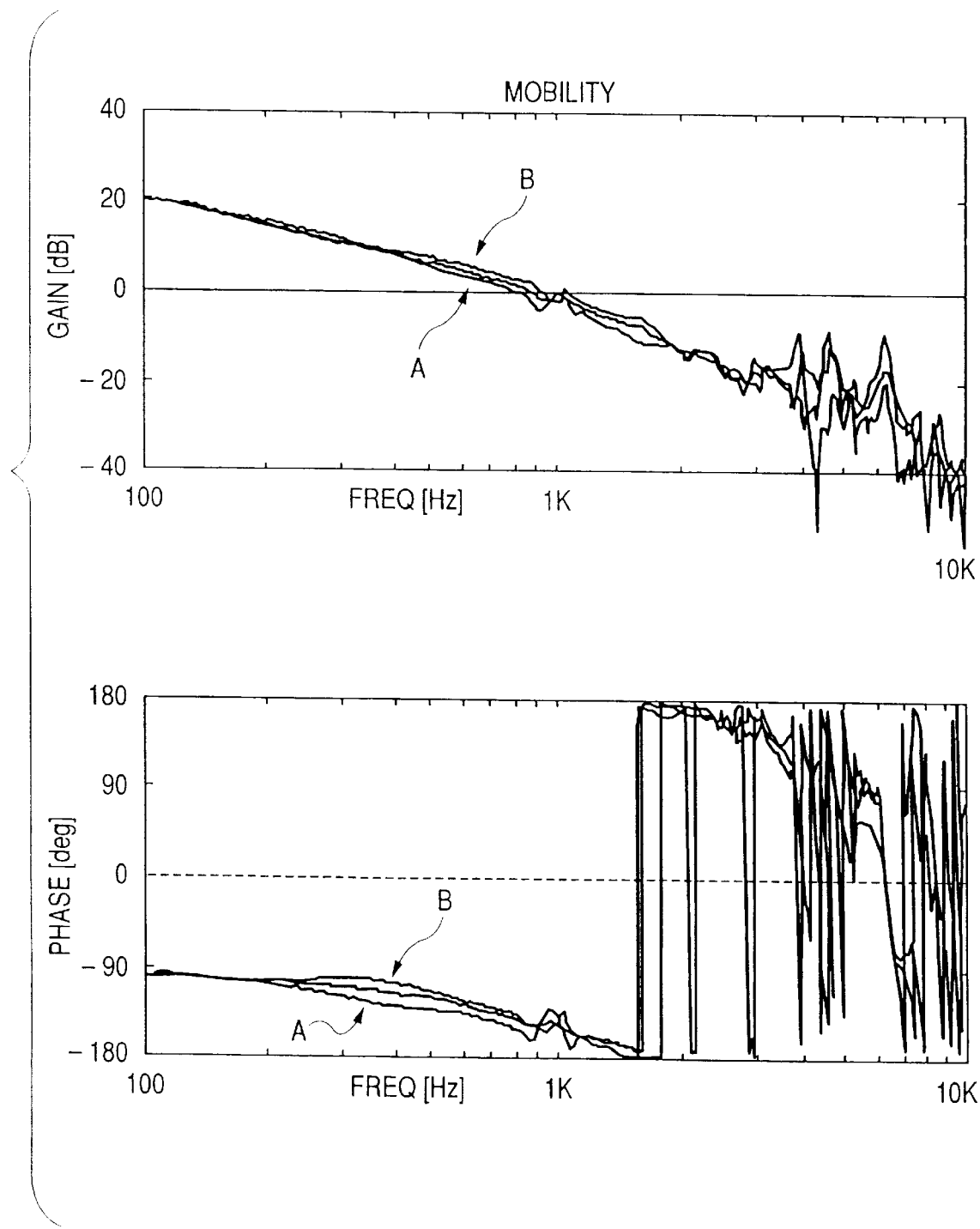
FIG. 4 is a graph showing the transfer function of the positioning apparatus.

FIG. 4 is a graph showing the transfer function of a direct-acting positioning mechanism. In this graph, the transfer relationship between a thrust signal and a speed signal is plotted as a gain and phase on the frequency axis.

In this graph, three types of transfer functions obtained when the position measuring point is changed are compared with each other. A curve A in the graph represents the transfer function obtained when the encoder is set near the yaw guide 102. A curve B in the graph represents the transfer function obtained when the encoder 105 is set far from the yaw guide 102. The curve existing between the curves A and B in the graph represents the transfer function obtained when the position of the table is measured at a position near the barycentric position. A comparison between the curves A and B in the graph indicates a difference in phase waveform between low-frequency regions of 1 kHz or less, in particular. The curve B, obtained when the position detecting point is set far from the yaw guide, exhibits a stronger tendency to reduce the phase delay.

In designing a feedback loop compensator, an important servo-band is a frequency region of 1 kHz or less. A reduction in phase delay in this band is therefore advantageous in designing a control system with high responsivity. For this reason, in designing a compensator, the encoder is preferably positioned as far from the yaw guide as possible, because the resultant curve comes close in waveform to the curve B exhibiting the small phase delay.

The positional relationship between the barycentric position 111 of the table 101 and a driving position 114 at which the linear motor 104 applies a driving force to the table 101 will be described next.

In general, when the table is to be translated, the line of action of the driving force produced by an actuator for driving the table preferably passes through the center of gravity of the table. This is because, when the line of action passes through the center of gravity, any rotating force that is not required for the table is not produced. When, however, the table is translated, a resistance is generated at the yawing restraining position 112 in the direction opposite to the moving direction of the table for the following reason. Since a pre-pressurizing/chucking operation is performed between the table 101 and the yaw guide 102 by using the magnet, an eddy current is generated in the yaw guide serving as a magnetic member upon relative movement of the magnet and yaw guide. This generates a resistance in the direction opposite to the relative moving direction, and hence generates a magnetic viscous load. In addition, a very low viscosity resistance of a fluid is generated in the gap between the static pressure bearings. To prevent the table from undergoing rotation variations when the table is driven, consideration must be given to the resistance generated at the yaw guide restraining position.

Referring to FIG. 3, let R1 be the distance between the yawing restraining position 112 and the linear motor driving position 114, R2 be the distance between the barycentric position 111 and the linear motor driving position 114, Fd be the load at the yawing restraining position 112, and Fg be the inertial force acting at the barycentric position 111. The driving position 114 at which no moment is generated by these forces satisfies $$R1 \cdot Fd = R2 \cdot Fg.$$

When the linear motor 104 drives the table 101 at this position, no moment is generated in the table. Hence, the table undergoes no undesired yawing posture variations. This makes it possible to position the table at a high speed with a high precision.

In this embodiment, since the position of the table is measured at a position far from the yaw guide, and positioning control on the table is performed by using the measured signal during translation, a control system with high responsivity can be realized. The embodiment is especially advantageous for high-speed, high-precision position control on a positioning apparatus having a structure susceptible to posture variations in the yawing direction during movement, like a direct-acting positioning apparatus designed to perform "two-surface restraint guiding" (single-sided restraint) by means of a gravity guide and yaw guide.

Furthermore, since this positioning apparatus uses "single-sided restraint", the table is free from deformation due to an excessive restraint, unlike a positioning apparatus designed to restrain a table with two opposing surfaces.

Yawing of the table may be restricted as follows. The position of the table in the X direction is measured at two points, and the yawing amount of the table is measured. In addition, two actuators are prepared to apply driving forces to the table in the X direction. The yawing of the table is corrected by controlling each linear motor. With this arrangement, however, the size and cost of the apparatus increase. When, therefore, the restriction of yawing of the table in a statically determinate state is mechanically ensured, and position control on the table during movement is performed by feedback control using position information about the table, including the yawing amount, a high-speed, high-precision positioning apparatus can be provided with one table position measuring device and one actuator.

In addition, if the position at which a driving force is applied to the table is set at a position which is located between the guide surface of the yaw guide and the center of gravity of the table and at which the resistive force on the guide surface of the yaw guide balances with the moment based on the inertial force at the center of gravity, the yawing posture variations during the movement of the table can be reduced.

This embodiment uses the encoder to measure the position of the table. However, the present invention is not limited to this. For example, a laser interferometer may be used. In addition, the embodiment uses the pre-pressurizing mechanism using the attraction force of the magnet as a pre-pressure. However, the present invention is not limited to this. For example, a pre-pressurizing mechanism may be formed by using the pre-pressure based on vacuum suction.

<Second Embodiment>

Figure 5:
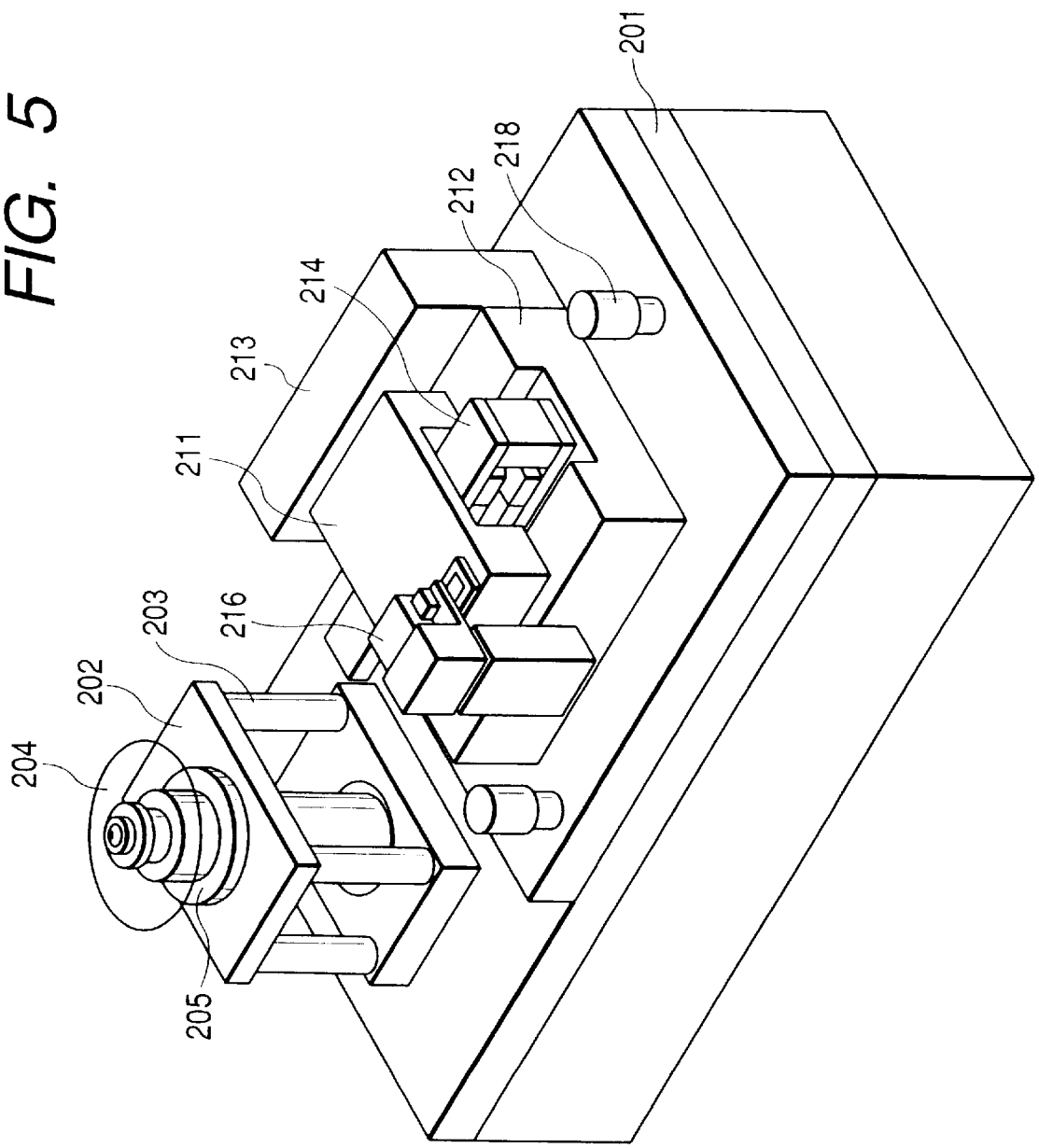
FIG. 5 is a schematic perspective view of a servo-track writer according to the present invention.

FIG. 5 is a perspective view showing a servo-track writer using the above positioning apparatus according to an embodiment of the present invention.

Columns 203 for supporting a sub-base 202 are formed on a base 201. The sub-base 202 holds a motor 205 for rotating a disk 204. An encoder (not shown) for measuring the rotational angle of the disk 204 is mounted on the motor 205.

A head (not shown) is mounted on a stage 211 that can move in a single-axis direction. A gravity guide 212 supports the stage 211 on a horizontal reference surface and restrains pitching of the stage 211 in the stage traveling direction and the posture of the stage 211 in the rolling direction. The gravity guide 212 is made of a magnetic member and has a polished reference surface. A yaw guide 213 has a guide surface perpendicular to the reference surface of the gravity guide 212. The yaw guide 213 is made of a magnetic member and its guide surface is polished. Static pressure bearings are mounted on two surfaces of the stage 211 which oppose the gravity guide 212 and yaw guide 213. The stage 211 is supported in a noncontact state. The manner in which the stage is supported by the static pressure bearings will be described later.

An electromagnetic linear motor 214 linearly drives the stage 211 in a noncontact state. The linear motor 214 has a linear motor stator fixed to be substantially integrated with the gravity guide 212 and a linear motor moving-element fixed to be substantially integrated with the stage 211. The linear motor stator is housed in a recess portion formed in the gravity guide. The linear motor 214 extends through the interior of the stage.

An encoder 216 measures the position of the stage 211. The encoder 216 has an optical or magnetic linear scale and a head as a detection unit. When an optical encoder is used, an LED with high durability is preferably used as the light source of the detection unit. Quartz is used as a material for the scale to obtain stable position information with high precision. Positioning control on the stage 211 is performed by a closed loop in which the position information about the stage 211 which is measured by the encoder 216 is fed back.

Micro-heads 218 are used to adjust the tilt of a stage unit with respect to the base 201. The stage unit is used to position the stage 211. The micro-heads 218 are mounted at three points to adjust the tilt of the stage unit by adjusting the levels of the stage unit with respect to the base at the three points. By adjusting the tilt of the stage unit, the tilts of the disk 204 and the head (not shown) mounted on the stage can be adjusted. The floating amount of the head with respect to the disk can be stably maintained by adjusting the tilts of the head and disk.

Figure 6:
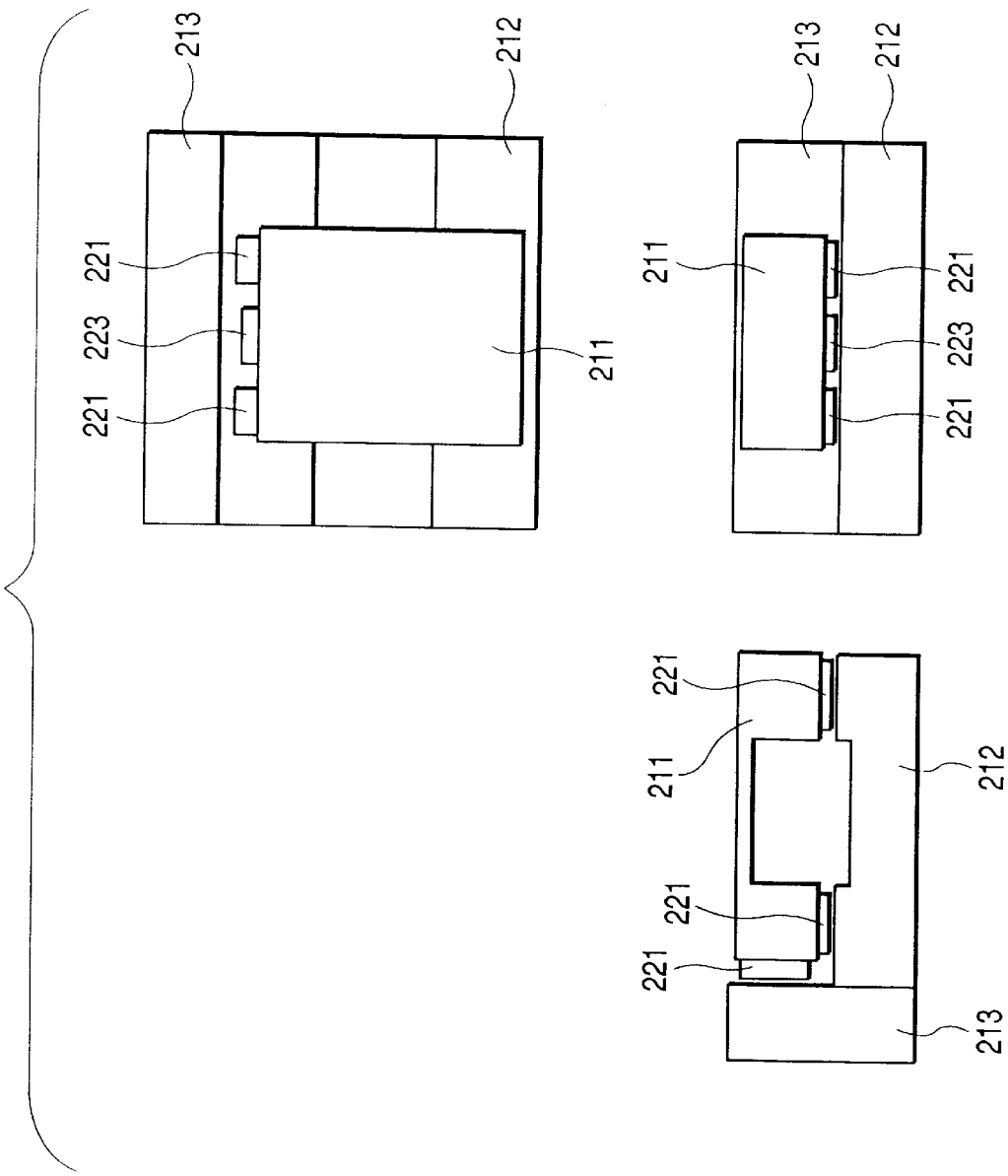
FIG. 6 is a schematic view showing a static pressure guide mechanism used in the servo-track writer according to the present invention.

FIG. 6 shows a static pressure guide mechanism used in the present invention.

Referring to FIG. 6, static pressure bearings 221 maintain gaps between the stage 211 and the guides 212 and 213 by uniformly blowing high-pressure air against the guides 212 and 213, thereby supporting the stage 211 in a noncontact state. As each static pressure bearing, a member obtained by polishing a solid, lubricous, porous material is used. A pre-pressurizing mechanism 223 generates an attraction force between itself and the magnetic guide to pre-pressurize the gap formed by the static pressure bearings so as to increase the spring stiffness. By pre-pressurizing the stage 211 against the yaw guide using the pre-pressurizing mechanism 223, the stage 211 is supported by the yaw guide 213. This allows the yaw guide 213 to stably guide the stage 211 even with "single-sided restraint guiding". With the static pressure bearings 221 and pre-pressurizing mechanism 223 mounted on the stage 211, the stage 211 is restrained by the two surfaces, namely the reference surface of the gravity guide and the guide surface of the yaw guide.

Figure 7:
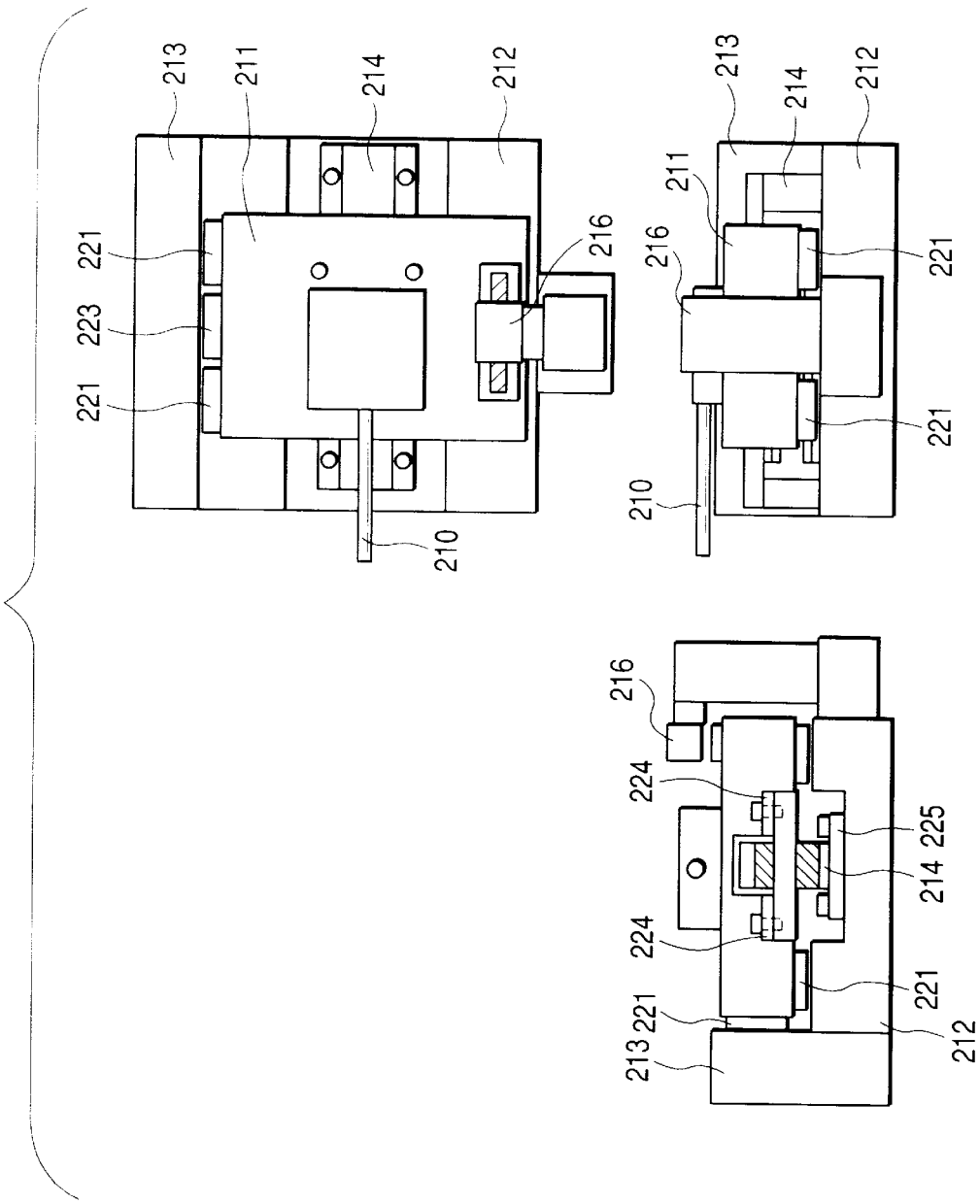
FIG. 7 is a schematic view showing a stage unit used in the servo-track writer according to the present invention.
Figure 8:
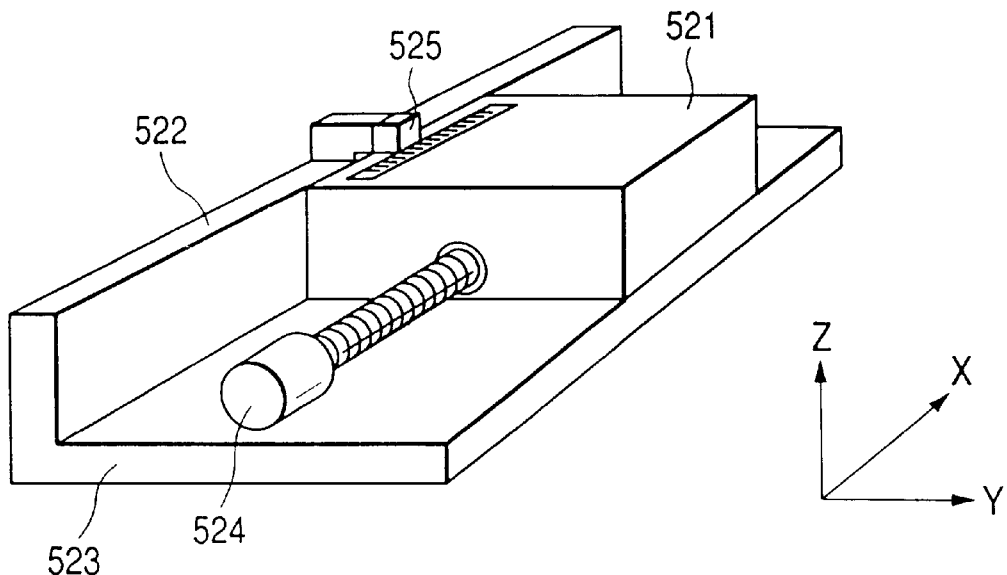
FIG. 8 is a perspective view of a conventional positioning apparatus.
Figure 9:
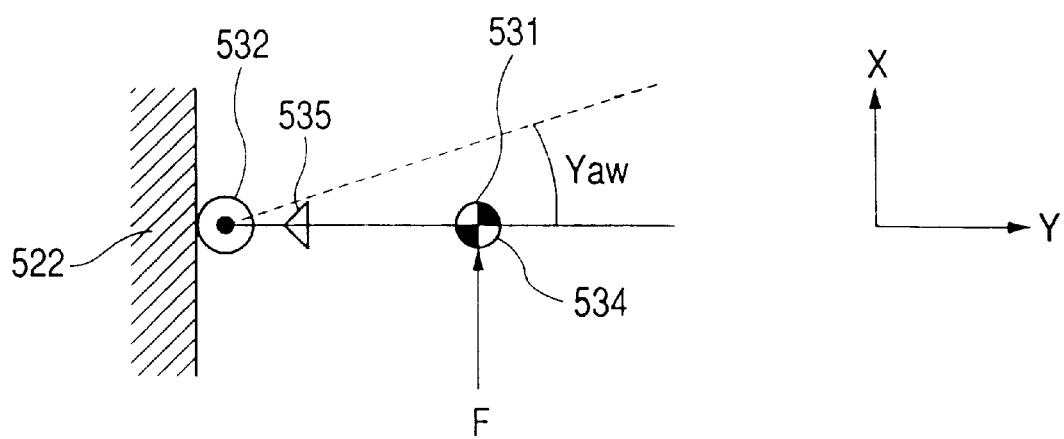
FIG. 9 is a view showing a model of the conventional positioning apparatus.

FIG. 7 is a schematic view showing a stage unit used in the present invention.

The same reference numerals in FIG. 7 denote the same parts as in FIG. 6, and hence a description thereof will be omitted.

An arm assembly 210 holding a head is mounted on a stage 211. A recess portion is formed in the stage 211 and a gravity guide 212 along the traveling direction, and a linear motor 214 is housed in the space formed by the recess portion. The linear motor stator is detachably fixed on the gravity guide 212 with screws, and the linear motor moving-element is detachably fixed on the stage 211 with screws. That is, the linear motor 214 is detachably fixed on the stage unit. The linear motor 214 is positioned to apply a thrust to the barycentric portion of the stage. Spacers 224 and 225 are inserted between the linear motor moving-element and the stage and between the linear motor stator and the gravity guide, respectively. This makes it possible to adjust the position at which the linear motor 214 applies a thrust to the stage. The linear motor 214 uses a moving coil scheme. The linear motor moving-element has a coil. The linear motor stator has a magnet. A flexible cable made of a flat cable (not shown) is used to supply a current to the coil of the linear motor moving-element, and the resistance to the action of the linear motor moving-element is small.

In the servo-track writer of this embodiment, the position of the table is measured at a position far from the yaw guide, and positioning control on the table during translation is performed by using the measurement signal, thereby realizing a control system with high responsivity. The embodiment is especially advantageous for high-speed, high-precision position control on a positioning apparatus having a structure susceptible to posture variations in the yawing direction during movement, like a direct-acting positioning apparatus designed to perform "two-surface restraint guiding" (single-sided restraint) by means of a gravity guide and yaw guide.

According to the servo-track writer of this embodiment, with the use of the static pressure guide, the magnetic recording head held by the arm assembly mounted on the stage can be positioned with high precision, and the settling time can be greatly shortened. In addition, with the use of the static pressure guide, since the frictional resistance decreases, the reproducibility of the position of the head driven by the stage becomes very high.

In addition, since the stage is guided by the two orthogonal flat surfaces, the degree of freedom in designing a guide mechanism increases as a whole. In particularly designing an arrangement in which the thrust generated by a linear motor is applied to the barycentric portion of a stage, an arrangement using one linear motor to apply a thrust to the center of gravity of a stage can be easily designed. Furthermore, since the stage is supported/guided in a non-contact state with respect to the two orthogonal flat surfaces, the stage is not excessively restrained. Hence, the stage is free from deformation.

Since the thrust generated by the linear motor is applied to the center of gravity of the stage, the resonance frequency of the stage can be set to be high. In addition, changes in the posture (yawing, pitching, and rolling) of the stage in the traveling direction can be suppressed low. This allows high-speed positioning control on the head.

The recess portion (trench) is formed near the center of the static pressure surface in the horizontal direction to extend along the traveling direction, and the linear motor is disposed in the recess portion, thereby allowing the linear motor to be detachably mounted without disassembling the guide mechanism. Therefore, maintenance and replacement of the linear motor can be easily performed without disassembling/readjusting the guide mechanism which is assembled with high precision. In addition, even if the barycentric position of the stage changes as the weight of the load changes depending on the conditions of the magnetic head, disk, and the like, an adjustment can be made by replacing the spacers of the linear motor to make the thrust generated by the linear motor pass through the center of gravity of the stage. This makes it possible to form a versatile servo-track writer.

Since the solid, lubricous, porous static pressure bearings are used for the static pressure guide mechanism, even if the supply of air is stopped, the bearings hardly scratch the static pressure surface. In addition, with the use of the static pressure guide mechanism, maintenance need not be performed for a long period of time. This can improve the productivity.

In this embodiment, the linear scale is set on the stage side, and the detection unit is set on the fixed unit side. Even if, therefore, the stage moves, the single cable of the detector is not dragged, and the influences of this movement on the positioning precision and settling time are small. In addition, the reproducibility of the position of the head is high.

Since the linear motor uses the moving coil scheme, the linear motor moving-element is small, and a reduction in the weight of the stage as a movable portion can be attained.

This embodiment uses the magnet for the pre-pressurizing mechanism. However, the present invention is not limited to this. For example, the suction force produced by vacuum suction may be used. In this case, the material for the guide is not limited to a magnetic material.

In addition, the encoder is used to measure the position of the stage. However, the present invention is not limited to this. For example, the position information measured by using a laser interferometer may be fed back.

This embodiment uses the linear motor of the moving coil scheme. However, the present invention is not limited to this. A linear motor of a moving magnet scheme may be used. In this case, since a magnet is fixed on the stage side as a movable member, no wiring for the supply of a current is required, and high-precision positioning can be performed.

In this embodiment, the tilt of the stage unit is adjusted by adjusting the level of the stage unit at the three points using the micro-heads. However, the present invention is not limited to this. If, for example, a spherical base is used, level adjustment may be performed at two points using the micro-heads.

With the arrangement of this embodiment, a magnetic head inspection apparatus for inspecting a magnetic head used for a hard disk and a magnetic disk inspection apparatus for inspecting a magnetic disk used for a hard disk can be formed. In this case, the magnetic head or motor with an encoder, which is used to rotate the magnetic head, is mounted on the table of the direct-acting positioning apparatus described above. Alternatively, the motor for rotating the magnetic disk may be mounted on the table of the direct-acting positioning apparatus described above. A high-speed, high-precision inspection apparatus can be provided by using the positioning apparatus of this embodiment for a magnetic head inspection apparatus or magnetic disk inspection apparatus.

What is claimed is:

1. A positioning apparatus comprising:
   a movable member;
   an actuator for driving said movable member in a moving direction;
   a first guide having a reference surface for supporting said movable member in a gravity direction;
   a second guide for guiding said movable member from one side thereof in the moving direction by means of a guide surface perpendicular to the reference surface; and
   a measuring device for measuring a position of said movable member in the moving direction,
   wherein said measuring device is one in number and a distance from a measuring position at which said measuring device measures the position of said movable member to the guide surface is longer than a distance from a driving position at which said actuator drives said movable member to the guide surface.

2. An apparatus according to claim 1, wherein said movable member is supported to said guides by static pressure bearings.

3. An apparatus according to claim 2, further comprising a pre-pressurizing mechanism for pre-pressurizing said static pressure bearings.

4. An apparatus according to claim 3, wherein said pre-pressurizing mechanism comprises a magnet.

5. An apparatus according to claim 1, wherein said actuator comprises a linear motor.

6. An apparatus according to claim 1, wherein said actuator for driving said movable member in the moving direction is one in number.

7. An apparatus according to claim 1, wherein said measuring device comprises an encoder.

8. An apparatus for effecting at least one of recording and reproducing information, said apparatus comprising:
   a movable member on which a magnetic head or magnetic disk is mounted;
   an actuator for driving said movable member in a moving direction;
   a first guide having a reference surface for supporting said movable member in a gravity direction;
   a second guide for guiding said movable member from one side thereof in the moving direction by means of a guide surface perpendicular to the reference surface; and
   a measuring device for measuring a position of said movable member in the moving direction,
   wherein said measuring device is one in number and a distance from a measuring position at which said measuring device measures the position of said movable member to the guide surface is longer than a distance from a driving position at which said actuator drives said movable member to the guide surface.

9. An inspection apparatus comprising:
   a movable member on which a magnetic head or magnetic disk is mounted;
   an actuator for driving said movable member in a moving direction;
   a first guide having a reference surface for supporting said movable member in a gravity direction;
   a second guide for guiding said movable member from one side thereof in the moving direction by means of a guide surface perpendicular to the reference surface; and
   a measuring device for measuring a position of said movable member in the moving direction,
   wherein said measuring device is one in number and a distance from a measuring position at which said measuring device measures the position of said movable member to the guide surface is longer than a distance from a driving position at which said actuator drives said movable member to the guide surface.

10. A positioning apparatus comprising:
    a movable member;
    an actuator for driving said movable member in a moving direction;
    a first guide having a reference surface for supporting said movable member in a gravity direction;
    a second guide for guiding said movable member from one side thereof in the moving direction by means of a guide surface perpendicular to the reference surface; and
    a measuring device for measuring a position of said movable member in the moving direction,
    wherein said measuring device is one in number and a distance from a driving position at which said actuator drives said movable member to the guide surface is shorter than a distance from the center of gravity of said movable member to the guide surface.

11. An apparatus according to claim 10, wherein said movable member is supported to said guides by static pressure bearings.

12. An apparatus according to claim 11, further comprising a pre-pressurizing mechanism for pre-pressurizing said static pressure bearings.

13. An apparatus according to claim 12, wherein said pre-pressurizing mechanism comprises a magnet.

14. An apparatus according to claim 10, wherein said actuator comprises a linear motor.

15. An apparatus according to claim 10, wherein said actuator for driving said movable member in the moving direction is one in number.

16. An apparatus according to claim 10, wherein said measuring device comprises an encoder.

17. An apparatus for effecting at least one of recording and reproducing information, said apparatus comprising:
- a movable member on which a magnetic head or magnetic disk is mounted;
- an actuator for driving said movable member in a moving direction;
- a first guide having a reference surface for supporting said movable member in a gravity direction;
- a second guide for guiding said movable member from one side thereof in the moving direction by means of a guide surface perpendicular to the reference surface; and
- a measuring device for measuring a position of said movable member in the moving direction,
- wherein said measuring device is one in number and a distance from a driving position at which said actuator drives said movable member to the guide surface is shorter than a distance from the center of gravity of said movable member to the guide surface.

18. An inspection apparatus comprising:
- a movable member on which a magnetic head or magnetic disk is mounted;
- an actuator for driving said movable member in a moving direction;
- a first guide having a reference surface for supporting said movable member in a gravity direction;
- a second guide for guiding said movable member from one side thereof in the moving direction by means of a guide surface perpendicular to the reference surface; and
- a measuring device for measuring a position of said movable member in the moving direction,
- wherein said measuring device is one in number and a distance from a driving position at which said actuator drives said movable member to the guide surface is shorter than a distance from the center of gravity of said movable member to the guide surface.

19. An information recording/reproducing apparatus comprising a motor for rotating a disk and a stage unit for holding and positioning a head and being adapted to effect at least one of recording information on the disk and reproducing information from the disk by relatively moving the head and the disk, said stage unit comprising:
- a stage holding the head;
- a linear motor for driving said stage in a moving direction;
- a first guide having a reference surface for supporting said stage in a gravity direction;
- a second guide for guiding said stage from one side thereof in the moving direction by means of a guide surface perpendicular to the reference surface;
- static pressure bearings mounted on said stage to oppose said first guide and said second guide;
- a pre-pressurizing mechanism for pre-pressurizing said static pressure bearings; and
- a measuring device for measuring a position of said stage in the moving direction,
- wherein said measuring device is one in number and a distance from a driving position at which said actuator drives said stage to the guide surface is shorter than a distance from the center of gravity of said stage to the guide surface.

20. An inspection apparatus comprising a motor for rotating a disk and a stage unit for holding and positioning a head and being adapted to inspect the disk or the head by relatively moving the head and the disk, said stage unit comprising:
- a stage holding the head;
- a linear motor for driving said stage in a moving direction;
- a first guide having a reference surface for supporting said stage in a gravity direction;
- a second guide for guiding said stage from one side thereof in the moving direction by means of a guide surface perpendicular to the reference surface;
- static pressure bearings mounted on said stage to oppose said first guide and said second guide;
- a pre-pressurizing mechanism for pre-pressurizing said static pressure bearings; and
- a measuring device for measuring a position of said stage in the moving direction,
- wherein said measuring device is one in number and a distance from a driving position at which said actuator drives said stage to the guide surface is shorter than a distance from the center of gravity of said stage to the guide surface.

* * * * *